United States Patent
Sarkar et al.

(10) Patent No.: US 12,465,466 B2
(45) Date of Patent: Nov. 11, 2025

(54) POWDER-FREE INTRAORAL SCANNING AND IMAGING SYSTEM

(71) Applicant: MEDIT CORP., Seoul (KR)

(72) Inventors: Saradwata Sarkar, Redondo Beach, CA (US); Mark Greenwood, Granite Bay, CA (US); Mark Chang-Ming Hsieh, Peterborough (GB); James Lee Onslow, Cambridge (GB)

(73) Assignee: MEDIT CORP., Seoul (KR)

( * ) Notice: Subject to any disclaimer, the term of this patent is extended or adjusted under 35 U.S.C. 154(b) by 384 days.

(21) Appl. No.: 18/091,456

(22) Filed: Dec. 30, 2022

(65) Prior Publication Data

US 2023/0210642 A1    Jul. 6, 2023

Related U.S. Application Data

(60) Provisional application No. 63/294,944, filed on Dec. 30, 2021.

(51) Int. Cl.
*A61C 9/00* (2006.01)

(52) U.S. Cl.
CPC .................... *A61C 9/006* (2013.01)

(58) Field of Classification Search
CPC ... A61C 9/0053; A61C 7/002; A61C 13/0004; A61C 9/006; A61C 7/08; A61C 13/34; A61C 13/0019; A61C 19/04; A61C 5/50; A61C 19/06; A61C 9/0046; A61C 19/006; A61C 2203/00; A61C 19/05; A61C 7/10; A61C 9/0073; A61C 2204/007; A61C 9/0066; A61C 19/10; A61C 2007/004; A61C 9/008; A61C 13/082; A61C 7/146;

(Continued)

(56) References Cited

U.S. PATENT DOCUMENTS

| | | | |
|---|---|---|---|
| 10,764,557 B2 * | 9/2020 | Babayoff | A61C 9/0066 |
| 11,671,582 B2 * | 6/2023 | Fisker | G01B 11/2518 |
| | | | 348/136 |

(Continued)

FOREIGN PATENT DOCUMENTS

| | | | | |
|---|---|---|---|---|
| EP | 3202366 A1 * | 8/2017 | ......... | A61C 13/0004 |
| EP | 3808311 A1 * | 4/2021 | ......... | A61B 1/00009 |

(Continued)

OTHER PUBLICATIONS

Extended European Search Report dated May 3, 2023 in Application No. 22217285.0.

*Primary Examiner* — Michael P Stafira

(74) *Attorney, Agent, or Firm* — Sughrue Mion, PLLC

(57) ABSTRACT

An intraoral scanning system is described herein. The intraoral scanning system includes a scanning device and a processing device. The scanning device is configured to illuminate an object of interest with a burst light pattern at one or more intervals and receive a set of reflected images reflected off the object of interest. The processing device is configured to receive the set of reflected images from the scanning device and convert the set of reflected images into a three-dimensional model of the object of interest. The burst light pattern comprises a first image and a second image in succession. One of the first image and the second image is a structured light image and the other of the first image and the second image is an unstructured light image.

17 Claims, 10 Drawing Sheets

(58) Field of Classification Search
CPC .. A61C 13/09; A61C 5/77; A61C 7/20; A61C 19/045; A61C 11/006; A61C 11/02; A61C 11/06; A61C 13/08; A61C 7/12; A61C 7/36; A61C 1/088; A61C 17/221; A61C 13/00; A61C 13/01; A61C 17/222; A61C 2204/005; A61C 8/0006; A61C 9/00; A61C 1/082; A61C 13/0003; A61C 13/0009; A61C 7/00; A61C 8/0001; A61C 8/0036; A61C 9/0006; A61C 9/004; A61C 9/0093; A61C 13/0022; A61C 13/087; A61C 17/20; A61C 17/3481; A61C 19/043; A61C 19/063; A61C 7/02; A61C 9/0086; G01B 11/2509; G01B 11/2518; G01B 11/2513; G01B 11/25; G01B 2210/52; G01B 11/254; G01B 11/24; G01B 11/2545; G01B 11/2504; G01B 11/2536; G01B 11/2531; G01B 11/002; G01B 21/042; G01B 11/03; G01B 11/2433; G01B 9/02; G01B 11/00; G01B 11/2441; G01B 11/303; G01B 9/0209; G01J 3/508; G01J 3/51; G01J 3/513; G01J 3/0264; G01J 3/02; G01J 3/0208; G01J 3/0278; G01J 3/50; G01J 3/524; G01J 3/463; G01J 2003/1213; G01J 2003/2869; G01J 3/0205; G01J 3/0218; G01J 3/0224; G01J 3/0229; G01J 3/0237; G01J 3/0251; G01J 3/0262; G01J 3/04; G01J 3/10; G01J 3/2803; G01J 3/46; G01J 3/0272; G01J 3/462; G01J 3/465; G01J 3/501

See application file for complete search history.

(56) References Cited

U.S. PATENT DOCUMENTS

| | | | | |
|---|---|---|---|---|
| 2009/0087050 | A1* | 4/2009 | Gandyra | G01C 11/02 382/128 |
| 2015/0198483 | A1* | 7/2015 | Ishimaru | A61B 5/1455 356/451 |
| 2019/0282342 | A1* | 9/2019 | Aubailly | A61B 1/0605 |
| 2020/0404243 | A1* | 12/2020 | Saphier | H04N 23/90 |
| 2021/0058561 | A1* | 2/2021 | Wu | A61C 9/006 |
| 2021/0186667 | A1* | 6/2021 | Abu-Tarif | A61B 1/00096 |
| 2024/0423570 | A1* | 12/2024 | Park | A61C 9/006 |

FOREIGN PATENT DOCUMENTS

| | | | | |
|---|---|---|---|---|
| KR | 2056910 B1 | * | 12/2019 | ........ A61B 5/0062 |
| WO | WO-2009063088 A2 | * | 5/2009 | ........ A61C 9/006 |
| WO | WO-2014121278 A1 | * | 8/2014 | ........ A61B 1/00009 |
| WO | WO-2018219800 A1 | * | 12/2018 | ........ A61B 1/04 |
| WO | WO-2019207588 A2 | * | 10/2019 | ........ A61B 1/00163 |

* cited by examiner

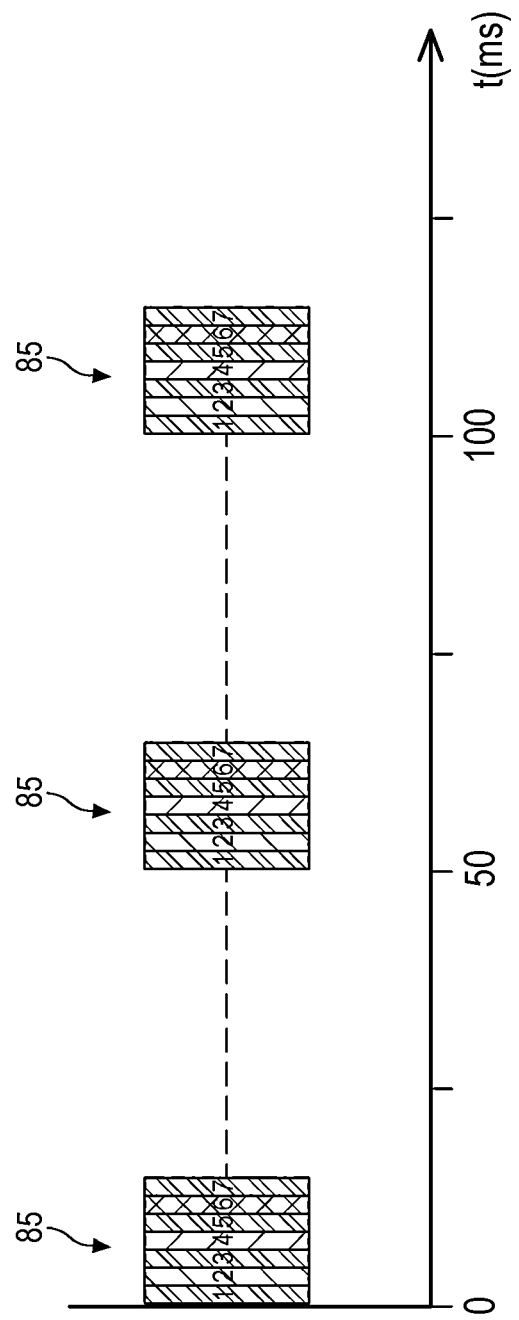

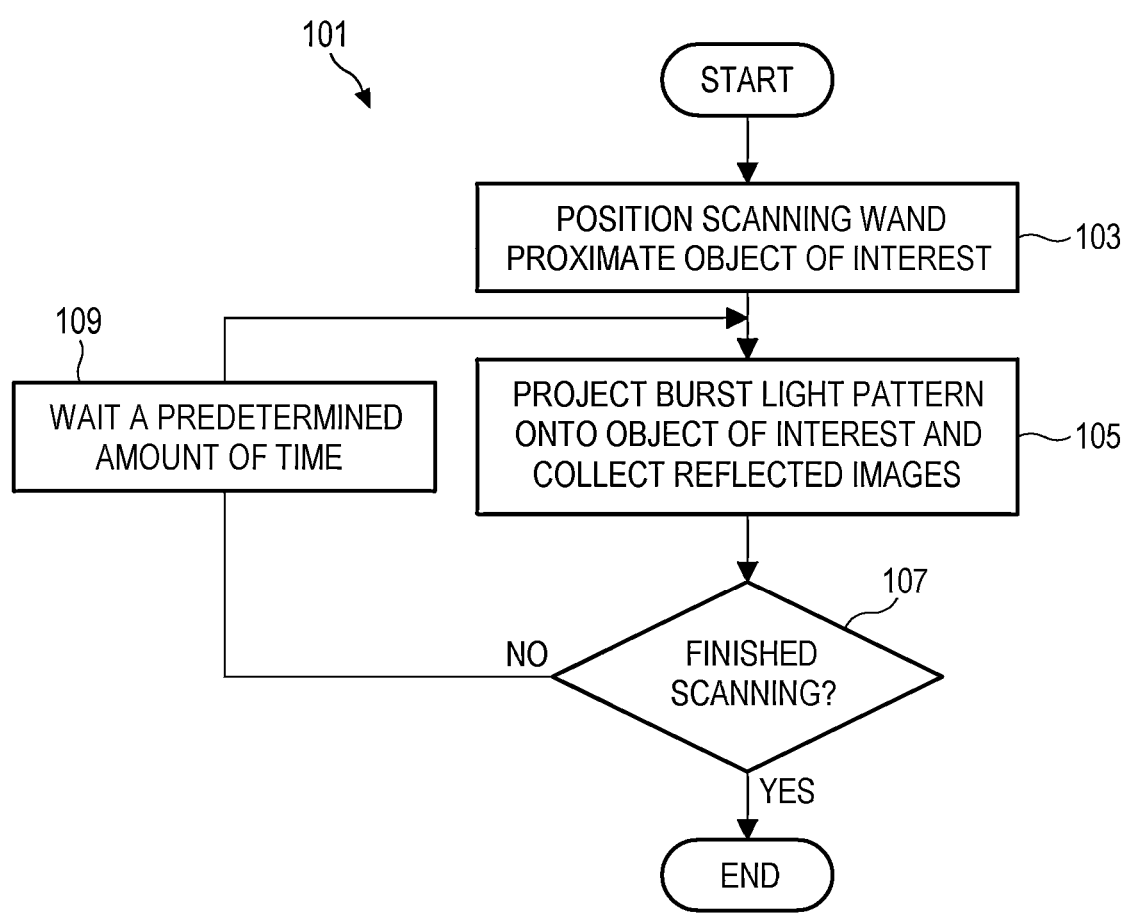

POWDER-FREE INTRAORAL SCANNING AND IMAGING SYSTEM

CROSS-REFERENCE TO RELATED APPLICATION

This application is based upon and claims the benefit of U.S. Provisional Patent Application No. 63/294,944, filed on Dec. 30, 2021, which is incorporated by reference herein in its entirety.

TECHNICAL FIELD

The present disclosure relates to an intraoral scanning and imaging system.

BACKGROUND

In the dentistry context, intraoral scanning and imaging may be used to capture images of a patient's teeth and gingival structure. These images may then be used to create and project a digital three-dimensional image of the teeth and gingival structure to a dentist or oral surgeon for use and manipulation in treating the patient. However, with respect to scanning, teeth are poorly reflective and possibly include stains or other inconsistencies regarding surface reflectiveness. Further, a patient's mouth can only provide limited space for which to illuminate and scan structures therein. Thus, light beams reflected off teeth can only provide limited understanding of the three-dimensional features of the teeth.

Projecting a structured light image onto teeth allows the structured light to deform when striking surfaces. This deformation allows vision or sensor systems to calculate a three-dimensional depth and surface information of an object of interest. However, projecting static structured light has heretofore been inconsistent and error prone and thus, most intraoral scanning and imaging systems utilize a dynamic structured light projected onto a surface to be scanned. Dynamic structured light generation, projection, capture, and decoding require increased resources, including bandwidth, energy, and logic circuitry. Further, a significant amount of heat is generated as a byproduct of the resource requirements and usage for projecting dynamic structured light. Thus, a need exists in the intraoral scanning field for a more efficient powder-free intraoral scanning and imaging system; namely, a system with low resource requirements that minimizes errors and heat generation.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to an aspect of the present disclosure, an intraoral scanning system is provided. The intraoral scanning system includes a scanning device configured to illuminate an object of interest with a burst light pattern at one or more intervals and receive a set of reflected images reflected off the object of interest and a processing device configured to receive the set of reflected images from the scanning device and convert the set of reflected images into a three-dimensional model of the object of interest. The burst light pattern includes a first image and a second image in succession. One of the first image and the second image is a structured light image and the other of the first image and the second image is an unstructured light image.

According to another aspect of the present disclosure, a method is provided for alternately projecting a structured light image and an unstructured light image at one or more intervals onto an object of interest, receiving a set of reflected images reflected off the object of interest, generating digital data from the set of reflected images, and transmitting the digital data to a processing device configured to generate a three-dimensional model of the object of interest from the digital data.

According to another aspect of the present disclosure, a scanning device is provided. The scanning device includes a first light emitting device configured to illuminate a structured light image, a second light emitting device configured to illuminate an unstructured light image, an image sensor, a memory configured to store instructions, and a processor. The processor is operatively coupled to the memory and configured to execute the instructions to alternately project the structured light image and the unstructured light image at one or more intervals onto an object of interest by the first light emitting device and the second light emitting device, receive a set of reflected images reflected off the object of interest by the image sensor, and generate digital data from the set of reflected images by the image sensor for a three-dimensional model of the object of interest.

BRIEF DESCRIPTION OF DRAWINGS

While the specification concludes with claims which particularly point out and distinctly claim the disclosure, it is believed the present disclosure will be better understood from the following description of certain examples taken in conjunction with the accompanying drawings, in which like reference numerals identify the same elements and in which:

FIG. 10 depicts a diagrammatic view of an exemplary timeline for usage of the burst light pattern of FIG. 9 within the intraoral scanning system of FIG. 1;

FIG. 11 depicts a flowchart representing an exemplary method used in the intraoral scanning system of FIG. 1.

Figure 1:
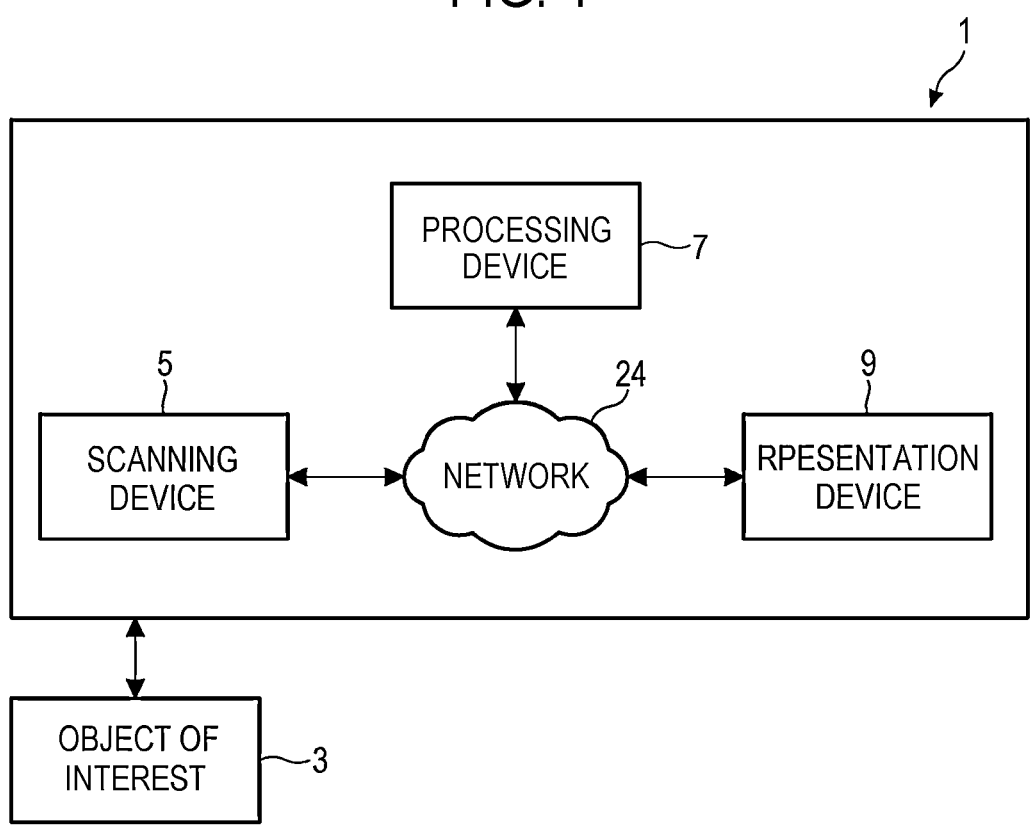
FIG. 1 depicts a block diagram of an exemplary operating environment of an exemplary intraoral scanning system for use with an intraoral dental object of interest, including a scanning device, a processing device, and a presentation device in communication with one another via a network.

The drawings are not intended to be limiting in any way, and it is contemplated that various embodiments of the disclosure may be carried out in a variety of other ways, including those not necessarily depicted in the drawings. The accompanying drawings incorporated in and forming a part of the specification illustrate several aspects of the present disclosure, and together with the description serve to explain the principles of the disclosure; it being understood, however, that this disclosure is not limited to the precise arrangements shown.

DETAILED DESCRIPTION

The following description of certain examples of the disclosure should not be used to limit the scope of the present disclosure. Other examples, features, aspects, embodiments, and advantages of the disclosure will become apparent to those skilled in the art from the following description, which is by way of illustration, one of the best modes contemplated for carrying out the disclosure. As will be realized, the disclosure is capable of other different and obvious aspects, all without departing from the disclosure. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 8:
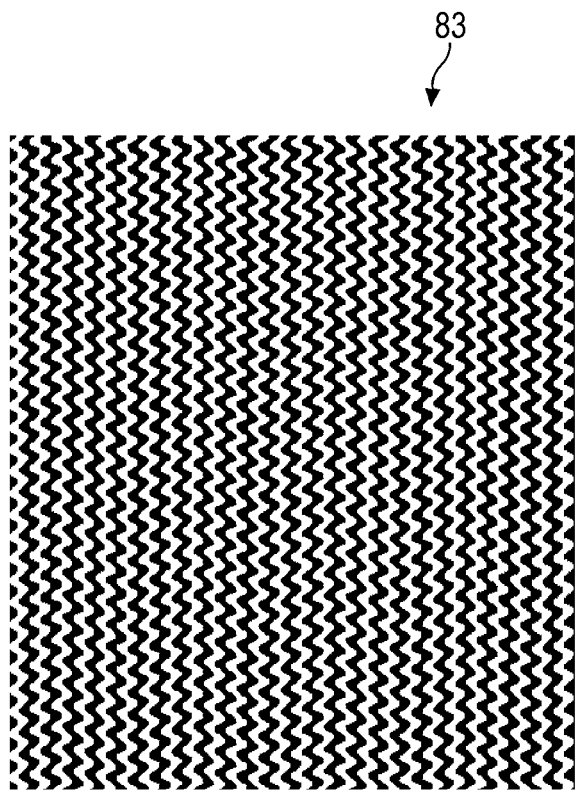
FIG. 8 depicts an exemplary structured light image for use in the intraoral scanning system of FIG. 1.

As referenced herein, the terms "structured light" and "structured light image" are used to denote an image having a known pattern such as a grid, horizontal or vertical bars, or various illuminated square shaped features, such as shown in FIG. 8. As referenced herein, the terms "unstructured light" and "unstructured light image" are used to denote a blank image without any patterns or structured light features therein. As referenced herein, the term "burst light pattern" is used to denote a burst projection of structured light images and unstructured light images in a particular sequence.

Some examples of the present disclosure are directed to a scanning system comprising an intraoral scanning system for creating a digital three-dimensional scan of an object of interest. The intraoral scanning system may include a burst light pattern comprising a first image and a second image, wherein the first image and the second image are projected in succession, wherein one of the first image and the second image is a structured light image, and wherein the other of the first image and the second image is an unstructured light image; a scanning device configured to illuminate an object of interest with the burst light pattern at selected intervals and receive a set of reflected images reflected off the object of interest; a processing device configured to convert the set of reflected images into a three-dimensional model; and a presentation device configured to present the three-dimensional model.

Some examples of the present disclosure are directed to a method of scanning an object. The steps of this method may include positioning a scanning wand proximate to an object of interest; projecting a burst light pattern onto the object of interest and recording a set of reflected images reflected off the object of interest; determining whether the scanning is complete; upon determining the scanning is not complete, waiting a predetermined time and thereafter proceeding back to the projecting and recording step.

I. Intraoral Scanning System

As shown in FIG. 1, some examples of the present disclosure may be depicted as an intraoral scanning system 1 configured to acquire three-dimensional digital images of an object of interest 3 such as teeth, bite, or gingival structure. Some examples of the intraoral scanning system 1 may include a scanning device 5. The scanning device 5 is generally configured to project a structured light image and an unstructured light image onto the object of interest 3 and capture resulting reflected images. Some examples of the intraoral scanning system 1 may include a processing device 7. The processing device 7 is generally configured to reconstruct a three-dimensional shape and color of at least a portion of the object of interest 3 based on the reflected images captured by the scanning device 5. The intraoral scanning system 1 may further include a presentation device 9. The presentation device 9 is generally configured to display the reconstructed three-dimensional shape of the object of interest 3 to a user.

In some examples of the intraoral scanning system 1, the scanning device 5, the processing device 7, and/or the presentation device 9 may send and receive communications between one another directly. Some examples of the intraoral scanning system 1, the scanning device 5, the processing device 7, and/or the presentation device 9 may send and receive communications between one another indirectly through a network 24. The network 24 may include one or more private or public networks (e.g., the Internet) that enable the exchange of data.

A. Exemplary Computer System

Figure 2:
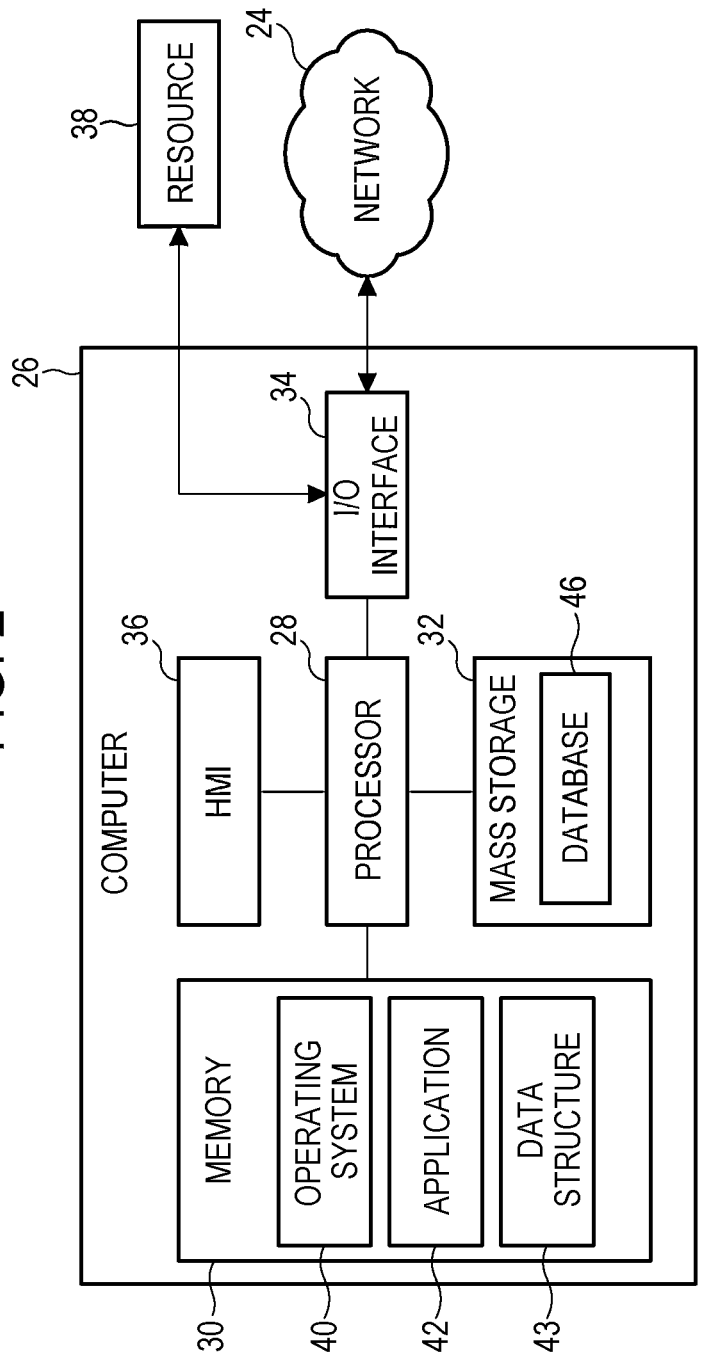
FIG. 2 depicts a block diagram of an exemplary computer system of the intraoral scanning system of FIG. 1.

Referring now to FIG. 2, the scanning device 5, the processing device 7, the presentation device 9, and the network 24 of intraoral scanning system 1 may incorporate therein or be implemented on one or more computing devices or systems, such as an exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or the I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random-access memory (SRAM), dynamic random access memory (DRAM), flash memory, cache memory, or any other device capable of storing information. The mass storage memory device 32 may include data storage devices such as a hard drive, optical drive, tape drive, non-volatile solid-state device, or any other device capable of storing information.

The processor 28 may operate under the control of an operating system 40 that resides in the memory 30. The operating system 40 may manage computer resources so that computer program code embodied as one or more computer software applications, such as an application 42 residing in the memory 30, may have instructions executed by the processor 28. In an alternative embodiment, the processor 28 may execute the application 42 directly, in which case the operating system 40 may be omitted. One or more data structures 44 may also reside in the memory 30, and may be used by the processor 28, the operating system 40, or the application 42 to store or manipulate data.

The I/O interface 34 may provide a machine interface that operatively couples the processor 28 to other devices and systems, such as the network 24 or the external resource 38. The application 42 may thereby work cooperatively with network 24 or external resource 38 by communicating via I/O interface 34 to provide the various features, functions, applications, processes, or modules comprising embodiments of the disclosure. Application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the disclosure may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of the computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, pushbuttons, control knobs, microphones, etc., capable of accepting commands or input from the user and transmitting the entered input to the processor 28.

A database 46 may reside on the mass storage memory device 32 and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where the query may be dynamically determined and executed by the operating system 40, other applications 42, or one or more modules.

B. Imaging Objects of Interest

As discussed above, the intraoral scanning system 1 is generally configured to capture digital images of an object of interest 3 whereby those images may be used to create a digital three-dimensional surface structure model of the object of interest 3 for use and manipulation by a user. Specifically, in the dentistry context, the intraoral scanning system 1 may be used to capture images of a patient's teeth and gingival structure and display a digital three-dimensional image of the teeth and gingival structure to a dentist for use and manipulation in treating the patient.

Figure 3:
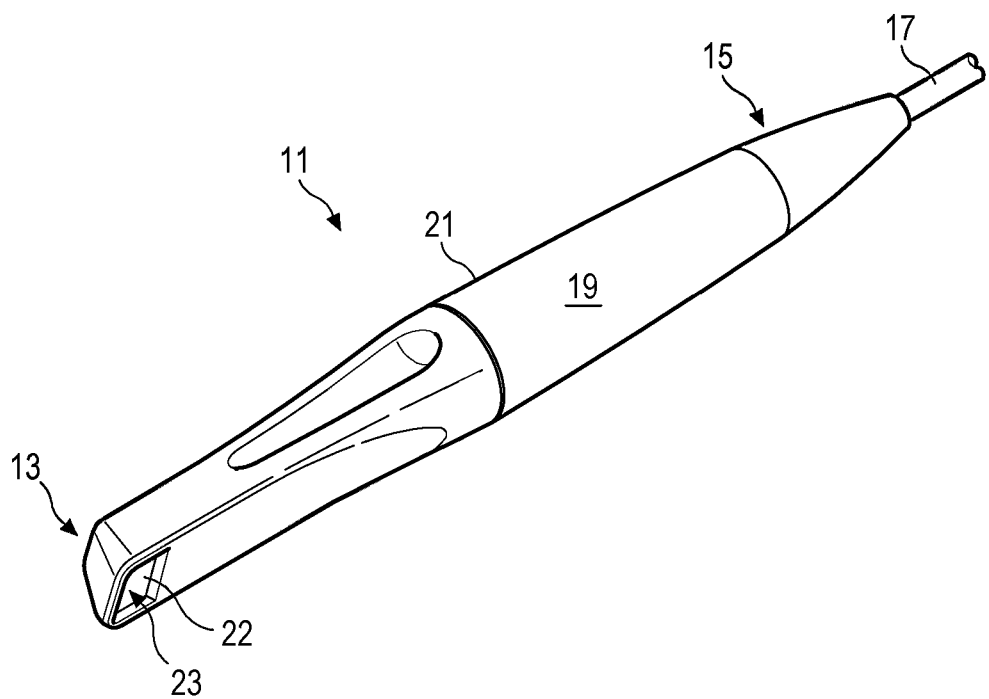
FIG. 3 depicts a perspective view of an exemplary scanning wand of the intraoral scanning system of FIG. 1.
Figure 5:
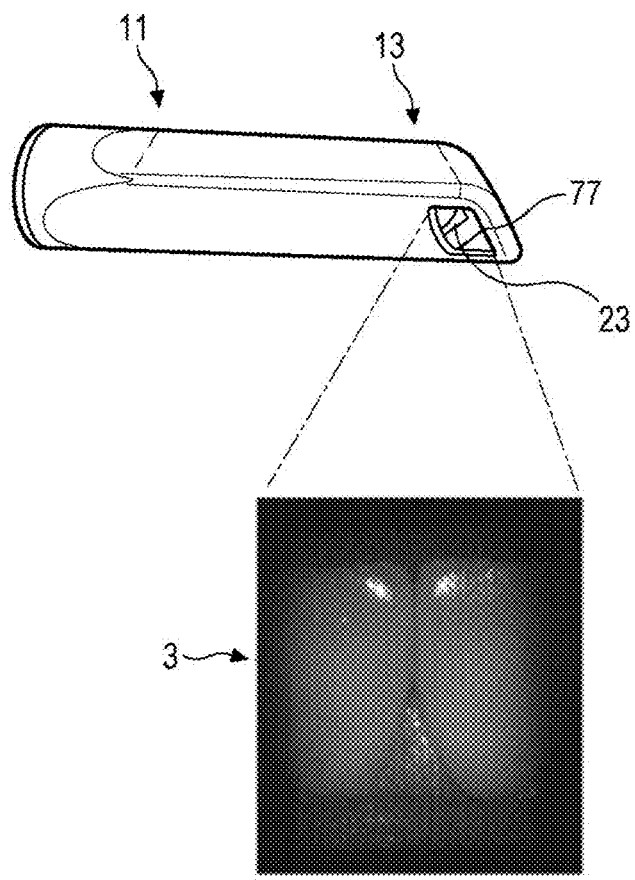
FIG. 5 depicts a perspective view of the scanning wand of FIG. 3 and an exemplary set of teeth.

As shown in FIGS. 3 and 5, the intraoral scanning system 1 may include a scanning wand 11. As illustrated, the scanning wand 11 is an example of the scanning device 5. The scanning wand 11 extends from a first end 13 to a second end 15, whereby a power and communication cable 17 may be attached. In other examples of the scanning wand 11, a communication cable 17 is absent and a wireless module (not shown) is incorporated within the scanning wand 11 to provide for wireless data communication. A housing 19 extends from a first end 13 to a second end 15 and includes a handle portion 21 disposed at generally the midpoint for use in manual grasping by a user. An observation window 23 is defined by a housing 19 at the first end 13 and may include a transparent cover 22.

Figure 4:
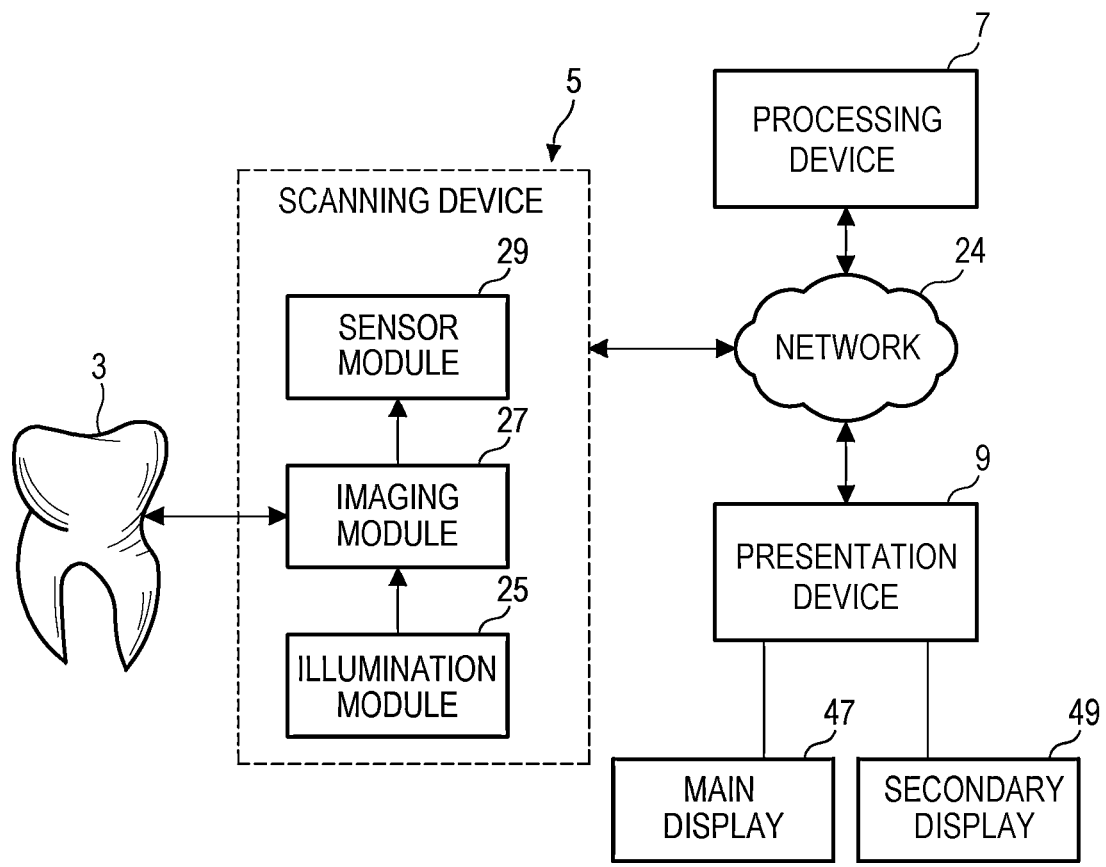
FIG. 4 depicts a schematic view of an exemplary illumination module, an exemplary imaging module, and an exemplary sensor module of the scanning device of FIG. 1.

As shown in FIG. 4, in some examples of the intraoral scanning system 1, some or all of the features or functionalities of the scanning device 5 are associated with the scanning wand 11. The scanning wand 11 may include various circuitry and/or elements described with respect to the computing system 26 to allow various modules to perform some or all of the various processing and computing functions of the scanning device 5. More specifically, the scanning device 5 may be described as having three modules, with each module aligned with the three general functions of the scanning device 5. The exemplary version of the scanning device 5 shown in FIG. 4 includes an illumination module 25, an imaging module 27, and/or a sensor module 29 to facilitate projecting a structured light image and an unstructured light image onto an object of interest 3 and capturing the resulting reflected images for further downstream processing. The illumination module 25 generally includes the light and structured light generation of the scanning device 5. The imaging module 27 generally includes the imaging tuning, focus, and refinement, either with respect to the outgoing illumination light and pattern stream, the incoming reflected image, or both. The sensor module 29 generally includes the digital capture of the incoming reflected image.

As described herein, the illumination module 25, the imaging module 27, and the sensor module 29 are exemplary groupings for use in describing the various features of the intraoral scanning system 1. Any of the associated features and methods described herein may be distributed or encapsulated by other modules, software objects, and/or circuitry within the intraoral scanning system 1 without departing from the spirit of the disclosure.

i. Illumination Module

As will be discussed below, the intraoral scanning system 1 projects both structured (i.e. patterned) light images and unstructured (i.e., blank and non-patterned) light images onto an object of interest 3 in a particular sequence to efficiently model the object of interest 3. In some examples of the intraoral scanning system 1, a colored unstructured light image is interspersed with a structured light image and the combined burst light pattern is projected onto the object of interest 3 at a particular repeating time interval.

In some examples of the intraoral scanning system 1 and the illumination module 25, the unstructured light image is generated by three different colored LED lights, with each LED light projecting a colored beam—one at a time—at different intervals while the other two LED lights are unilluminated. Broadly speaking, the structured light image is generated by a light emitting device such as a digital light projector/micromirror device or light is passed through etched glass or similar masking agent to create the structured light image. By interspersing unstructured light images of various colors with structured light images, the object of interest 3 can be efficiently scanned and modeled. In the dental context, both the teeth and gingival structure can be accurately scanned and differentiated due to the differences in reflective qualities between teeth and gingival tissue.

Figure 6:
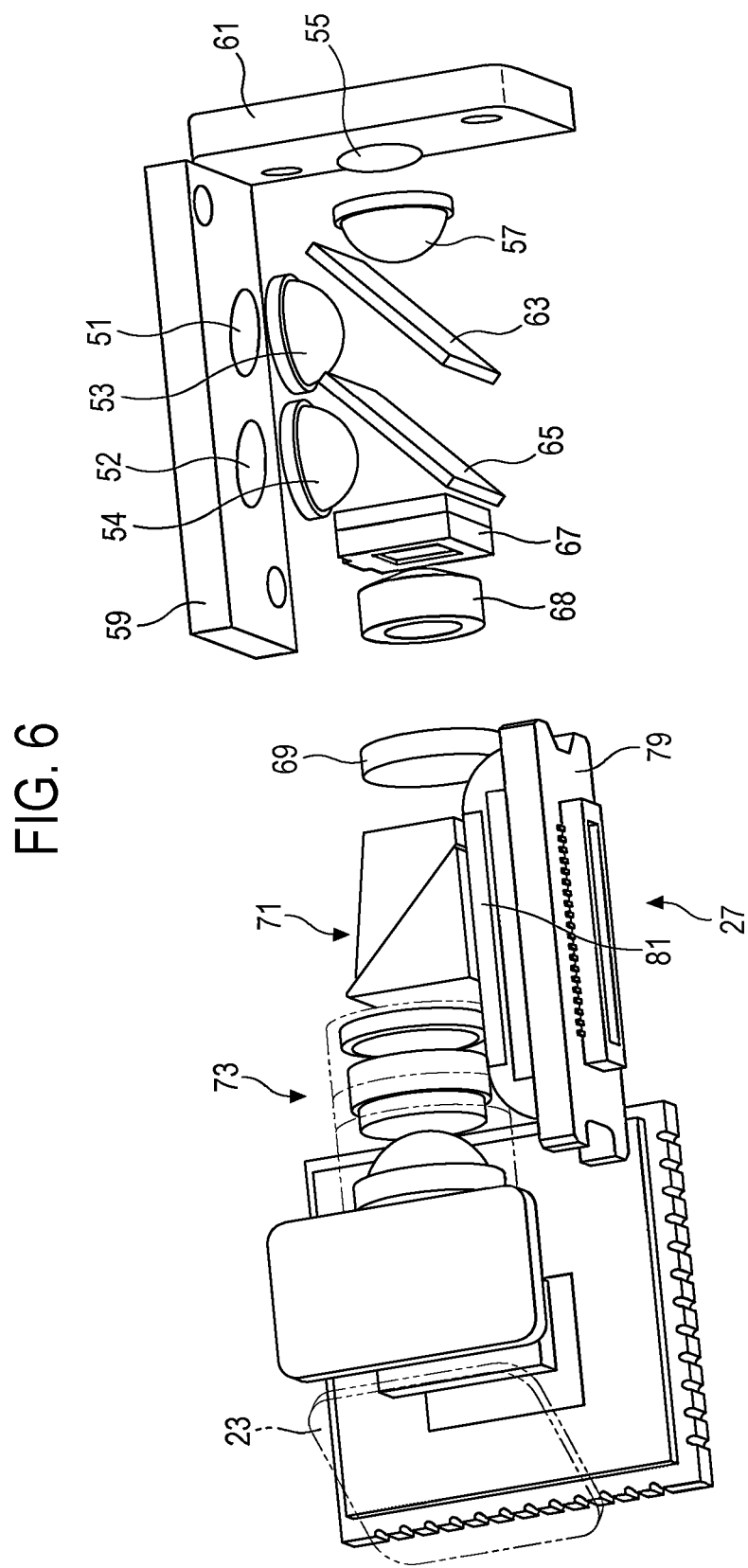
FIG. 6 depicts an exploded perspective view of exemplary elements within the scanning wand of FIG. 3.
Figure 7:
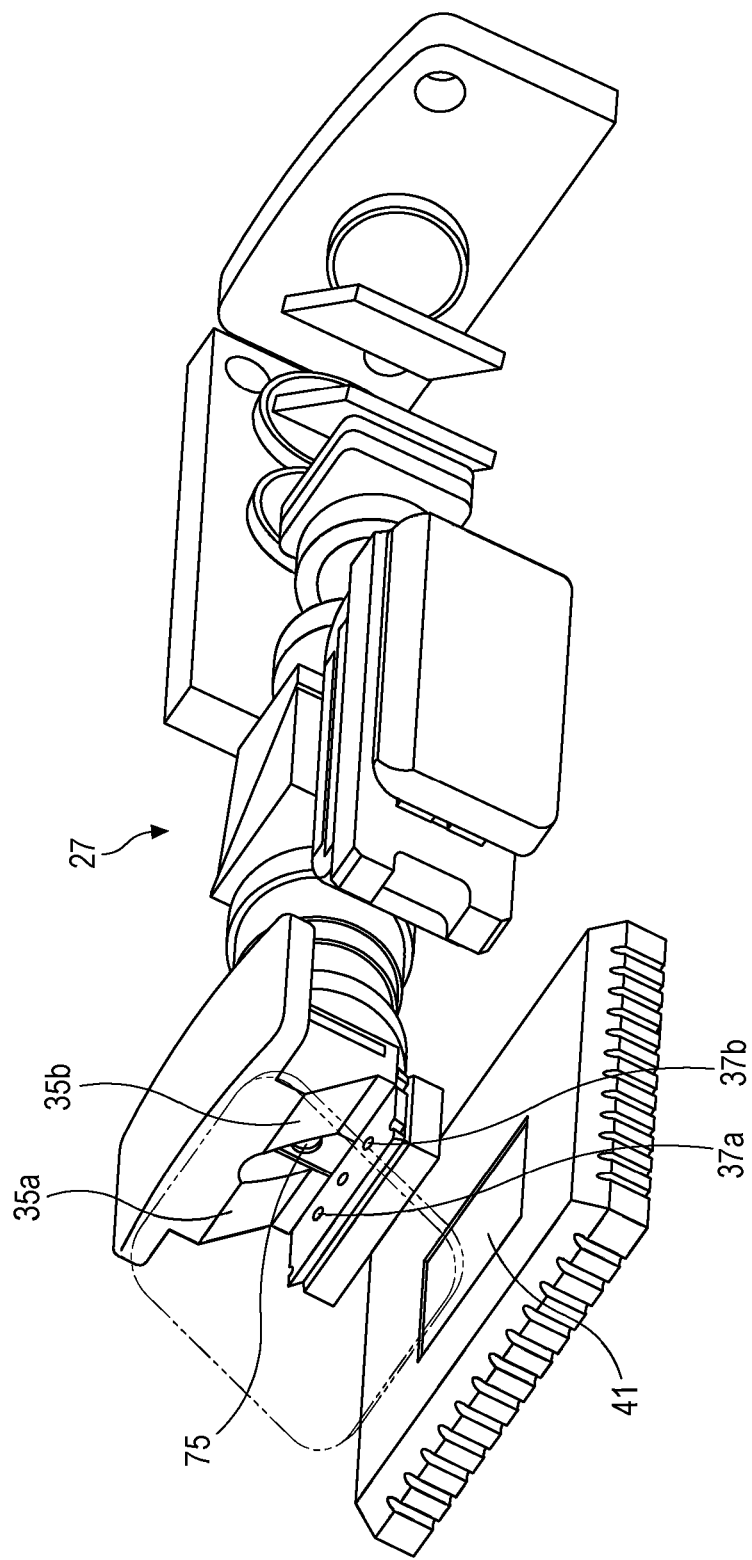
FIG. 7 depicts another exploded perspective view of exemplary elements within the scanning wand of FIG. 3.

With respect to an exemplary generation of the unstructured light image, as shown in FIGS. 6 and 7, the illumination module 25 includes a red LED light 52 proximate a red LED light condenser 54, a blue LED light 51 proximate a blue LED light condenser 53, and a green LED light 55 proximate a green LED light condenser 57. The condensers 54, 53, and 57 gather and shape the light emitted from their associated LED and focus the beam to further it along inside the illumination module 25. The red LED light 52, the blue LED light 51, and the green LED light 55 may be referred to collectively hereinafter as LED lights 52, 51, and 55. One or more LED heat sinks, shown as a first heat sink 59 and a second heat sink 61 may be incorporated into the illumination module 25 to absorb and reduce heat generated by any one of the LED lights 52, 51, and 55. One or more dichroic beam combiners, shown as a first dichroic beam combiner 63 and a second dichroic beam combiner 65, may be provided to focus and combine the three different light beams provided by the LED lights 52, 51, and 55 into a raw primary light beam. The raw primary light beam may be a combination of all three LED beams or a select one of those beams. For example, two beams may be turned off at any particular instance, while one may be turned on.

The raw primary light beam exits the dichroic beam combiners 63 and 65 and is thereafter directed through a micro lens array pair 67 to further homogenize and refine the beam into discrete uniform irradiance micro-beams for efficiency of detection by the sensor (discussed in greater detail below). After the micro lens array pair 67, the beam may be considered "refined" rather than "raw" and the refined beam is further conditioned and homogenized by directing the refined beam through one or more homogenizer lenses 68 and 69. In some embodiments, this homogenized beam may pass through a total internal reflection (TIR) prism 71, irradiate a DMD 81, and then pass back out through the TIR prism and onto a projection lens ensemble 73. In other embodiments, the homogenized beam may pass directly onto a projection lens ensemble 73 to further condition the beam. Thereafter the beam is passed through a projection aperture 75 (FIG. 7) and directed to a reflector 77 of the scanning wand 11, which directs the beam through the observation window 23 towards the object of interest 3 thus illuminating the object of interest 3 in a particular manner. The light from this beam is reflected off the object of interest 3, up through the observation window 23, off the reflector 77, recognized and collected by the sensor module 29 of the scanning device 5, and thereafter passed to the processing device 7.

With respect to an exemplary generation of the structured light image, as shown in FIGS. 6 and 7, the illumination module 25 includes a digital light projector (DLP) 79 for generating light. This light is passed through a digital micromirror device (DMD) 81 which creates a structure (i.e., pattern) within the light beam exiting the DLP 79 by turning and focusing various micro-mirrors (not shown) inside the DMD 81. This configuration creates a structure via micro-beams of light, with some micro-beams being dark or absent of meaningful light given the micro-beam was reflected away from the illumination path, and some micro-beams passed onward through the illumination path. Thus, because of the DMD 81, the light projected out of the DLP 79 contains a structure once it reaches the TIR prism 71.

The downstream mechanism for projecting the structured light image once it reaches the TIR prism 71 is similar to the unstructured light image. Namely, the structured light image is passed through the projection lens ensemble 73 to clean and refine the beam, through the projection aperture 75, off the reflector 77, through the observation window 23, out of the wand 11, and onto the object of interest 3. Once the beam hits the object of interest 3, it is reflected and collected by the sensor module 29 of the scanning device 5 and thereafter passed to the processing device 7. The features of the projected structured light image are known prior to projection. Therefore, any bending or warping of the projected structured light image is associated with three-dimensional features of the object of interest 3 and therefore may be recreated spatially in the digital model of the object of interest 3. The colored unstructured light images are not used to obtain geometry information, but to model the colors of an object of interest 3. Given the differences in color between teeth and gums, the color models generated through unstructured light images can be used to determine and separate teeth from gingival structure and in turn generate a more accurate three-dimensional digital model of a patient's intraoral structures and dentition. To restate, in the dental context, the intraoral imaging system 1 utilized a structured light to determine geometry and unstructured light to determine coloring and this information is combined to create a more accurate model of the underlying dentition.

In some examples of the illumination module 25, the structured light image projected via the DLP 79 may be combined with colored light from one of the LED lights 52, 51, and 55 to project a colored structured light image where the non-dark portions are also non-white light. For example, the DLP 79 may be configured to project generally white light through the DMD 81 to create a structure of white micro-beams interspersed with darkened or black micro-beams. In some examples of the illumination module 25, the blue LED light 51 may also be illuminated to pass a blue light beam through the upstream elements to combine with the structured light within the TIR prism 71 and overlay the white micro-beams with a blue hued light. The resulting beam is a structured light image with blue and dark micro-beams. Incorporating non-white micro-beams into the final structured light image may be used to create efficiencies and higher accuracy in creating the models. In particular, it has been found that because of the relatively short wavelength of blue light, blue structured light is well suited for imaging objects with some degree of transparency such as teeth because the short wavelength helps the light getting largely reflected instead of transmitted and/or absorbed.

One will readily recognize that the elements for creating light beams in the exemplary intraoral scanning system 1 can be rearranged and changed without departing from the spirit of the disclosure. For example, any one of LED lights 52, 51, and 55 may be moved upstream of any of the beam refining or homogenizing lens or the TIR prism 71. Further, inasmuch as structured light image may be combined with a colored light from one of the LED lights 52, 51, and 55, in some other examples of the illumination module 25, the DLP 79 may be replaced by any one of the LED lights 52, 51, and 55 to create the structured light image. For example, the DLP 79 may be replaced by the blue LED light 51 to generate blue micro-beams in the structured light image.

While FIGS. 6 and 7 depict the DMD 81 as the mechanism for providing the structured light image, it is also contemplated that a masking element such as etched glass may be used in place of the DMD 81 to create the structure in the projected light. In this example, a beam will be passed through the masking element/etched glass to create the dark/light micro-beams and thus the structure. In this scenario, certain other features may be moved such as moving the LED lights 52, 51, and 55 upstream of the masking element in the optical path to prevent the light created by these elements from being reformed into the structure.

ii. Imaging Module

As shown in FIG. 4, some examples of the scanning device 5 may include the imaging module 27. The imaging module 27 is an imaginary exemplary grouping of elements within the intraoral scanning system 1 used to illustrate the concept of additional processing of light transmitted from the illumination module 25, either prior to illumination onto an object of interest 3, after illumination, or both. The imaging module 27 may be considered an optional outgoing and/or incoming illumination refinement system. The imaging module 27 may be configured to focus and tune the light for efficient projection and imaging capture with respect to the object of interest 3. Some examples of imaging module 27 may include a varifocal lens (not shown) operably connected to an actuation element. The varifocal lens may be dynamically adjusted during scanning to focus and tune the projected structured light images as needed by changing the index of refraction of the lens. The actuation element facilitates the dynamic adjustment of the varifocal lens by varying an electric current gradient or an acoustic gradient associated with the actuation element to change the index of refraction. In some examples of the intraoral scanning system 1, the varifocal lens is non-mechanically adjustable for varying the focal length of the underlying lens. With respect to feedback regarding focusing and adjusting the varifocal lens, various focal sharpness and distance sensing features may be provided within imaging module 27 to tune the incoming reflected illuminated image.

iii. Structured Light Images

Structured light images are projected onto an object of interest 3 to aid in determining the three-dimensional features (also referred to as the "geometry") of the underlying object. Objects of interest 3 such as teeth are poorly reflective and possibly include stains or other inconsistencies regarding surface reflectiveness. Thus, unstructured light image can only provide a limited understanding of the three-dimensional features of the teeth. Projecting a known structure/pattern such as grids or horizontal bars onto an object allows the structure to deform when striking surfaces. This deformation allows vision/sensor systems to calculate the three-dimensional depth and surface information of an object of interest 3.

Structured light images can be single-shot, where a single structured image is projected, or multi-shot, where multiple structured time-multiplexed images are projected. Single-shot methods are well suited for dynamic high-speed applications but assume smooth local variations in the depth of the scene to be reconstructed. This limits the efficacy of single-shot methods in intraoral applications where the surface of a tooth of interest may have several sharp edges and discontinuities that violate this assumption.

There are several time-multiplexed structure generation techniques, such as Gray coding and Sinusoidal Phase Shift projection. The Gray structure generation technique is not suitable for high speed applications. Sinusoidal Phase Shift projection is widely used but susceptible to noise due to pixel crosstalk, which makes the acquired reflected images more difficult to process and prone to error.

Structure generation schemes can be "discrete" or "continuous." In discrete structure generation schemes, the intensities of structures are picked from a discrete set. Discrete structure generation approaches such as binary or N-ary Gray require several time-multiplexed structures to be projected on an object of interest for achieving higher resolution. Typically, the number of structures required is proportional to the log base N of the number of encoded regions. There are several other discrete structure generation approaches known in the art that use color or monochrome de Brujin sequences and M-arrays. All discrete approaches suffer in low albedo situations and when the shade of the object surface (e.g. stains on teeth) may interfere with the chroma interpretation of the reflected beam.

As will be discussed in greater detail below, the intraoral scanning system 1 illuminates an object of interest 3 using a particular burst of multiple frames in succession at a given time interval. Some examples of the intraoral scanning system 1 include a burst having a discrete static structured light image interspersed with differing unstructured light image in the form of blanket color illumination.

vi. Sensor Module

As shown in FIGS. 6 and 7, illumination is projected toward an object of interest 3 and a reflected image overlaid on the object of interest 3 is reflected back to the first end 13 of the scanning wand 11. In some examples of the intraoral scanning system 1, the reflected image is passed along directly to the sensor module 29. In other examples, the reflected image is passed through the imaging module 27 first, whereby the imaging module 27 may optionally apply image processing operations to the reflected image such as cropping, rotating, translating, reflecting, and similar operations. The imaging module 27 may also utilize the reflected image to refine or refocuses the various lenses of the imaging module 27 to sharpen the reflected image.

As shown in FIGS. 6 and 7, with respect to receiving the reflected image, the reflected image passes through the observation window 23 to the reflector 77 whereby it is directed towards imaging mirrors 35. The imaging mirrors 35 are shown in the illustrated embodiment as a pair of imaging mirrors 35a, 35b. Each imaging mirror 35a, 35b directs the reflected image through an associated imaging aperture 37a, 37b. Imaging apertures 37a, 37b mask out the broad reflected image into two channels and direct these two channels onto an image sensor 41 of the sensor module 29.

The image sensor 41 includes elements for receiving the reflected image and converting the optical/light stream into digital data. Some examples of the image sensor 41 include a CMOS camera element, a CCD camera element, or any other element for converting light into electrons. Converting the reflected image light into electrons via the image sensor 41 initiates the conversion into digital data to capture the images reflected off an object of interest 3.

Other examples of the image sensor 41 may include a light field camera or a plenoptic camera. Unlike conventional two-dimensional sensors that integrate light intensities reflected from different points of an object of interest, light field or plenoptic cameras preserve both light field intensity and direction of the reflected rays. Alternatively, an array of micro-lenses (not shown may be used in front of the image sensor 41 to compute light fields. However, the array of micro-lenses may require expensive and careful construction of the sensitive lens array optical elements. Thus, some examples of the sensor module 29 may include a coded mask (not shown), rather than an array of micro-lenses, in front of the image sensor 41. The coded mask may be disposed in front of the image sensor 41 and effectively frequency modulates the incoming reflected spatially multiplexed images. These reflected images can then be frequency demodulated to create a multi-depth plane digital image. In some examples, the coded mask may include an arrangement of pinhole apertures. The arrangement of pinhole apertures may be a pseudorandom arrangement or a deterministic arrangement.

The image sensor 41 may also be operatively connected to the imaging module 27 and/or the various lenses of the illumination module 25 with logic circuitry to determine whether an incoming reflected image is out of focus and provide a feedback control signals to fine tune the image via the imaging module 27 and/or various lenses of the illumination module 25. In some examples of the intraoral scanning system 1, the image sensor 41 provides a focusing offset along with a notification the incoming reflected image is out of focus. For example, if the image sensor 41 receives an incoming reflected image and determines the image is slightly unfocused or blurry in certain areas such as the periphery and determines the lens should be "zoomed out" three millimeters, the image sensor 41 signals to the illumination module 25 the image is out of focus along with a correction offset of +3 mm. This correction offset is thereafter used by the illumination module 25 to refocus the appropriate lens or lenses three millimeters deeper. Some examples of this feedback loop regarding the focus of the lenses of the illumination module 25 complete the loop in less than a microsecond, such that the illumination module 25 is constantly adjusting in essentially real time regardless of whether the user maintains the scanning wand 11 at a fixed distance from an object of interest 3.

iv. Processing Device

After receiving the captured images reflected off an object of interest 3 and converting these images to digital data, the sensor module 29 communicates the digitized reflected image data to the processing device 7. The processing device 7 may be embedded in a mobile computing cart (not shown) for bi-directional exchange of data. In those examples of the intraoral scanner 1 with a wired data connection, data is exchanged between the sensor module 29 and the processing device 7 via the cable 17. In those examples of the intraoral scanning system 1 with a wireless data connection, data is exchanged between the sensor module 29 and the processing device 7 via a wireless module (not shown) disposed in the scanning wand 11.

In some examples of the intraoral scanning system 1, the processing device 7 decodes an image captured by the sensor module 29 to create depth disparity maps. The depth maps are used to construct a point cloud representation of the shape of an object of interest 3. In practice, multiple point clouds would need to be generated to cover the entire volume of an object of interest 3. In some examples of the intraoral scanning system 1, an iterative closest point algorithm is used to register a set of point clouds to form a unified point cloud representing the entirety of an object of interest 3. Once these displayable forms of the captured object of interest 3 are generated by processing device 7, the final models and images are communicated to the presentation device 9 for display to a user.

v. Presentation Device

As shown in FIG. 4, presentation device 9 is configured to receive information regarding the display of an object of interest 3 and provide this visual information to a user. In some examples, the presentation device 9 comprises a main display 47. The main display 47 may comprise a desktop monitor, a laptop display, or a handheld smartphone or tablet. A user may view, turn, zoom in and out, an otherwise generally interact with the displayed model of an object of interest 3 via the presentation device 9 on the main display 47.

Current medical scanning procedures, such as intraoral scanning in a dental office, requires practitioners to rapidly switch their field of vision back and forth from the patient to a computer or monitor display providing real-time feedback. This decreases the efficiency of the procedure and increases the time overhead both for the patient and practitioner. To address these issues, some examples of the presentation device 9 may include a secondary display 49 to supplement the main display 47.

The secondary display 49 may comprise a headset, eyeglasses, contacts, or similar elements and provide to the user augmented reality (AR), virtual reality (VR), mixed reality (MR), or any similar technology. In some examples of a headset 47, the user may interact with the headset 47 via voice controls, hand gestures, or eye blinks.

The secondary display 49 may be configured to provide contextual information to a user by gathering information from a procedure environment and adding it to the user's field of view. This added information allows the user to continue the procedure without shifting their gaze or attention from the patient and/or an object of interest 3. For example, in an intraoral scanning application, secondary display 49 may illustrate the real-time three-dimensional reconstruction of the dental arch providing feedback to the practitioner. The secondary display 49 may also provide real-time information on the optimal path of the scanning wand 11 movement based on a status of the procedure. As a way of example, using the secondary display 49, the practitioner may also be able to visualize a semantic segmentation overlay of the tooth surfaces of interest and evaluate a plurality of dental implant approaches on the site of interest prior to the graft.

In some examples of the processing device 7, the secondary display 49 may be used to provide immersive training to practitioners without the need for a study patient. By way of example, dental practitioners may practice virtual intraoral scanning or restorative dentistry procedures without a patient. This can lead to a quicker pace of learning without adversely affecting clinical output.

C. Burst Light Patterns

Figure 9:
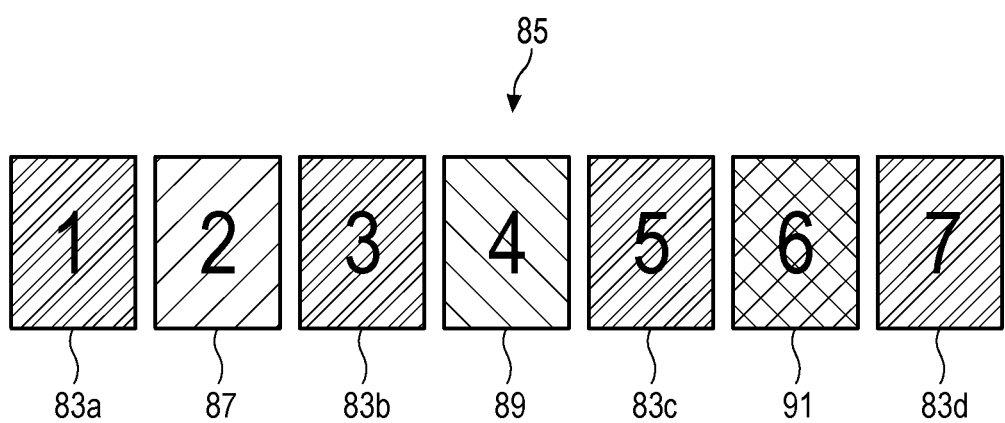
FIG. 9 depicts an exemplary burst light pattern incorporating the structured light image of FIG. 8 and for use in the intraoral scanning system of FIG. 1.

As shown in FIGS. 8-10, the intraoral scanning system 1 illuminates objects of interest using a particular burst format of multiple frames in sequence at a set time interval between bursts. The burst includes a structured light image interspersed with one or more unstructured light images, with the unstructured light images taking the form of blanket color illumination in the examples shown herein. An exemplary structured light image 83 is shown in FIG. 8 and is generally understood to be a "houndstooth" style structure. Exemplary unstructured light images are shown in FIG. 9 as a red blanket illumination 87, a green blanket illumination 89, and a blue blanket illumination 91. The houndstooth style structure or pattern was found beneficial for imaging teeth in particular based on extensive experimentation. The frequency of the houndstooth structure or pattern was adjusted experimentally until the sharpest contract was obtained on tooth-like optical materials.

An exemplary burst light pattern 85 is depicted in FIG. 9. The burst light pattern 85 includes a sequence of projected light in the following order: a structured light image 83a, a red blanket illumination 87, a structured light image 83b, a green blanket illumination 89, a structured light image pattern 83c, and a blue blanket illumination 91. As described above, reflected discrete structured light images aid in capturing the target's geometry. That is, the intraoral scanning system 1 may obtain accurate geometry information of a target object of interest based on one or more structured light images 83*a*, 83*b*, 83*c* and/or 83*d* as well as accurate color information based on one or more unstructured light image 87, 89, and/or 91. For example, the intraoral scanning system 1 may obtain accurate geometry of the target based on a burst light pattern including one of the structured light image 83*a*, 83*b*, 83*c* or 83*d* and one of the unstructured light image 87, 89, or 91, and create a three-dimensional model (e.g., a 3D image) of the target. It has been determined that projecting blanket colored illumination (unstructured light images) aid in capturing the underlying coloring of the target. Coloring of the target can be used in environments such as intraoral scanning to determine where the gumline starts with respect to the teeth, where the spaces are between the teeth, and where discolorations or striations exist on the teeth. This additional color-based information can be combined with the target's geometry data collected via the structured light images to create a colorized and more accurate model of the oral structure. This in turn can help providers in determining a treatment plan.

As shown in FIG. 10, a burst light pattern 85 is projected at a set time interval. In the example shown, the burst light pattern 85 occurs every 50-milliseconds, and lasts about 20 milliseconds, thus creating a 30-millisecond break between bursts. It has been found that this general timeframe, coupled with a 500 frames per second the image sensor 41 collects sufficient data to be transformed into a highly accurate oral model. The structured light images aid in creating accurate digital models of structures such as teeth and the unstructured light images aid in differentiating between structures as well as determining the color of the structures.

D. Color Matching

In the event a patient requires a new prosthetic tooth, intraoral scanning system 1 may be used to determine the color of the surrounding teeth to aid in matching the correct color of the prosthetic tooth to the surrounding teeth. Inasmuch as intraoral scanning system 1 includes white light via the DLP 79 or colored light via the red LED light 52, the blue LED light 51, and the green LED light 55, these differing lights may be used to flash the surrounding teeth with differing white and RGB colors to find the matching color for the prosthetic tooth. If using white light, the image sensor 41 would be configured as a color sensor; if using individual beams of red, green, or blue light, the image sensor 41 would be configured as a black and white sensor.

II. Intraoral Scanning Method

As shown in FIG. 11, some examples of the intraoral scanning system 1 may be depicted as an intraoral scanning method 101. The intraoral scanning method 101 is initiated with a step 103. In the step 103 a scanning wand of the intraoral scanning system 1, similar to scanning wand 11, is positioned over an object of interest 3. The step 103 thereafter proceeds to a step 105. In the step 105, a burst light pattern is projected onto the object of interest 3 and collected by the scanning wand 11 for processing. The burst light pattern may include both structured light images and unstructured light images in the form of blanket colored images. Thereafter, the step 105 proceeds to a step 107. The method 101 determines in the step 107 whether the scanning of the object of interest 3 is complete. If the scanning is complete, the method 101 ends. If the scanning is not complete, the step 107 proceeds to a step 109. In the step 109, the method 101 waits a pre-determined amount of time and thereafter proceeds back to the step 105.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An intraoral scanning system comprising: a scanning device configured to illuminate an object of interest with a burst light pattern at one or more intervals and receive a set of reflected images reflected off the object of interest; and a processing device configured to receive the set of reflected images from the scanning device and convert the set of reflected images into a three-dimensional model of the object of interest, wherein the burst light pattern comprises a first image and a second image in succession, and wherein one of the first image and the second image is a structured light image and the other of the first image and the second image is an unstructured light image.

Example 2

The intraoral scanning system of Example 1, wherein the burst light pattern comprises the first image and the second image sequentially alternating one or more times.

Example 3

The intraoral scanning system of Example 1 or 2, wherein the structured light image is a houndstooth pattern.

Example 4

The intraoral scanning system of one of Examples 1 to 3, wherein the unstructured light image is a blanket color.

Example 5

The intraoral scanning system of one of Examples 1 to 4, wherein the structured light image is configured to provide geometry information of the object of interest and the unstructured light image is configured to provide color information of the object of interest.

Example 6

The intraoral scanning system of one of Examples 1 to 5, wherein the scanning device comprises: a first light emitting device configured to illuminate the structured light image; a second light emitting device configured to illuminate the unstructured light image; an image sensor; a memory configured to store instructions; and a processor operatively coupled to the memory and configured to execute the instructions to: alternately project the structured light image and the unstructured light image at one or more intervals onto the object of interest by the first light emitting device and the second light emitting device, receive the set of reflected images reflected off the object of interest by the image sensor, and generate digital data from the set of reflected images by the image sensor for the three-dimensional model of the object of interest.

Example 7

The intraoral scanning system of one of Examples 1 to 6, wherein the scanning device further comprises a pair of mirrors directing a beam of light to the image sensor.

Example 8

The intraoral scanning system of one of Examples 1 to 7, wherein the processor is configured to illuminate the burst light pattern at the one or more intervals by the first light emitting device and the second light emitting device, and wherein the burst light pattern comprises a series of light images including the structured light image, followed by a first colored image, followed by the structured light image, followed by a second colored image, followed by the structured light image, followed by a third colored image.

Example 9

The intraoral scanning system of Example 8, wherein one of the first colored image, the second colored image, and the third colored image is a blanket blue color.

Example 10

The intraoral scanning system of one of Examples 1 to 9, wherein the unstructured light image includes a red blanket illumination, a green blanket illumination, or a blue blanket illumination.

Example 11

A method comprising: alternately projecting a structured light image and an unstructured light image at one or more intervals onto an object of interest; receiving a set of reflected images reflected off the object of interest; generating digital data from the set of reflected images; and transmitting the digital data to a processing device configured to generate a three-dimensional model of the object of interest from the digital data.

Example 12

The method of Example 11, wherein the structured light image is a houndstooth pattern.

Example 13

The method of Example 11 or 12, wherein the unstructured light image is a blanket color.

Example 14

The method of one of Examples 11 to 13, wherein alternately projecting the structured light image and the unstructured light image includes illuminating a burst light pattern at the one or more intervals, and wherein the burst light pattern comprises a series of light images including the structured light image, followed by a first colored image, followed by the structured light image, followed by a second colored image, followed by the structured light image, followed by a third colored image.

Example 15

The method of one of Examples 11 to 14, wherein the structured light image is configured to provide geometry information of the object of interest and the unstructured light image is configured to provide color information of the object of interest.

IV. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various examples of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

What is claimed is:

1. An intraoral scanning system comprising:
   a scanning device configured to illuminate an object of interest with a burst light pattern at one or more intervals and receive a set of reflected images reflected off the object of interest; and a processing device configured to receive the set of reflected images from the scanning device and convert the set of reflected images into a three-dimensional model of the object of interest, wherein the burst light pattern comprises a first image and a second image in succession, and wherein one of the first image and the second image is a structured light image and the other of the first image and the second image is an unstructured light image, wherein the structured light image is a houndstooth pattern.

2. The intraoral scanning system of claim 1, wherein the burst light pattern comprises the first image and the second image sequentially alternating one or more times.

3. The intraoral scanning system of claim 1, wherein the structured light image is a colored structured light image.

4. The intraoral scanning system of claim 1, wherein the unstructured light image is a blanket color.

5. The intraoral scanning system of claim 1, wherein the structured light image is configured to provide geometry information of the object of interest and the unstructured light image is configured to provide color information of the object of interest.

6. The intraoral scanning system of claim 1, wherein the unstructured light image includes a red blanket illumination, a green blanket illumination, or a blue blanket illumination.

7. A method comprising:

alternately projecting a structured light image and an unstructured light image at one or more intervals onto an object of interest;

receiving a set of reflected images reflected off the object of interest;

generating digital data from the set of reflected images; and transmitting the digital data to a processing device configured to generate a three-dimensional model of the object of interest from the digital data, wherein the structured light image is a houndstooth pattern.

8. The method of claim 7, wherein the structured light image is a colored structured light image.

9. The method of claim 7, wherein the unstructured light image is a blanket color.

10. The method of claim 7, wherein alternately projecting the structured light image and the unstructured light image includes illuminating a burst light pattern at the one or more intervals, and wherein the burst light pattern comprises a series of light images including the structured light image, followed by a first colored image, followed by the structured light image, followed by a second colored image, followed by the structured light image, followed by a third colored image.

11. The method of claim 7, wherein the structured light image is configured to provide geometry information of the object of interest and the unstructured light image is configured to provide color information of the object of interest.

12. The method of claim 7, wherein the unstructured light image includes a red blanket illumination, a green blanket illumination, or a blue blanket illumination.

13. A scanning device comprising:

a first light emitting device configured to illuminate a structured light image;

a second light emitting device configured to illuminate an unstructured light image;

an image sensor;

a memory configured to store instructions; and a processor operatively coupled to the memory and configured to execute the instructions to:

alternately project the structured light image and the unstructured light image at one or more intervals onto an object of interest by the first light emitting device and the second light emitting device, receive a set of reflected images reflected off the object of interest by the image sensor, and generate digital data from the set of reflected images by the image sensor for a three-dimensional model of the object of interest, wherein the structured light image is a houndstooth pattern.

14. The scanning device of claim 13, wherein the scanning device further comprises a pair of mirrors directing a beam of light to the image sensor.

15. The scanning device of claim 13, wherein the processor is configured to illuminate a burst light pattern at the one or more intervals by the first light emitting device and the second light emitting device, and wherein the burst light pattern comprises a series of light images including the structured light image, followed by a first colored image, followed by the structured light image, followed by a second colored image, followed by the structured light image, followed by a third colored image.

16. The scanning device of claim 15, wherein one of the first colored image, the second colored image, and the third colored image is a blanket blue color.

17. The scanning device of claim 13, wherein the structured light image is a colored structured light image.

* * * * *